United States Patent [19]

Kenison et al.

[11] Patent Number: 4,594,849
[45] Date of Patent: Jun. 17, 1986

[54] APPARATUS FOR SYNTHESIZING CONTROL PARAMETERS

[75] Inventors: David F. Kenison, Glastonbury; Donald E. Sheppard, South Windsor, both of Conn.

[73] Assignee: United Technologies Corporation, Hartford, Conn.

[21] Appl. No.: 683,904

[22] Filed: Dec. 20, 1984

[51] Int. Cl.⁴ .................................................. F02C 9/20
[52] U.S. Cl. ................................ 60/39.29; 364/431.02
[58] Field of Search ............... 60/39.27, 39.281, 39.29; 364/150, 151, 431.02

[56] References Cited

U.S. PATENT DOCUMENTS

| | | | |
|---|---|---|---|
| 4,212,161 | 7/1980 | Newirth et al. | 60/39.281 |
| 4,228,650 | 10/1980 | Camp | 60/39.281 |
| 4,249,238 | 2/1981 | Spang et al. | 364/431.02 |
| 4,307,451 | 12/1981 | Zagranski et al. | 60/39.281 |

Primary Examiner—Louis J. Casaregola
Attorney, Agent, or Firm—Stephen E. Revis

[57] ABSTRACT

A control system for a twin spool gas turbine engine for synthesizing a control parameter for the engine (such as the ratio of high compressor inlet temperature to low compressor inlet temperature) includes a function generator responsive to an engine operating parameter (such as corrected rotor speed) to generate a simulated value of the control parameter for a base engine configuration. A second function generator, responsive to an engine operating parameter, generates a simulated value of the difference between the value of the control parameter for the base engine configuration and the value of the parameter for another configuration. This difference is operated upon to correct it to the actual engine configuration. The corrected difference is added to the simulated value of the control parameter for the base configuration to give a simulated value of the control parameter for the actual engine configuration.

7 Claims, 1 Drawing Figure

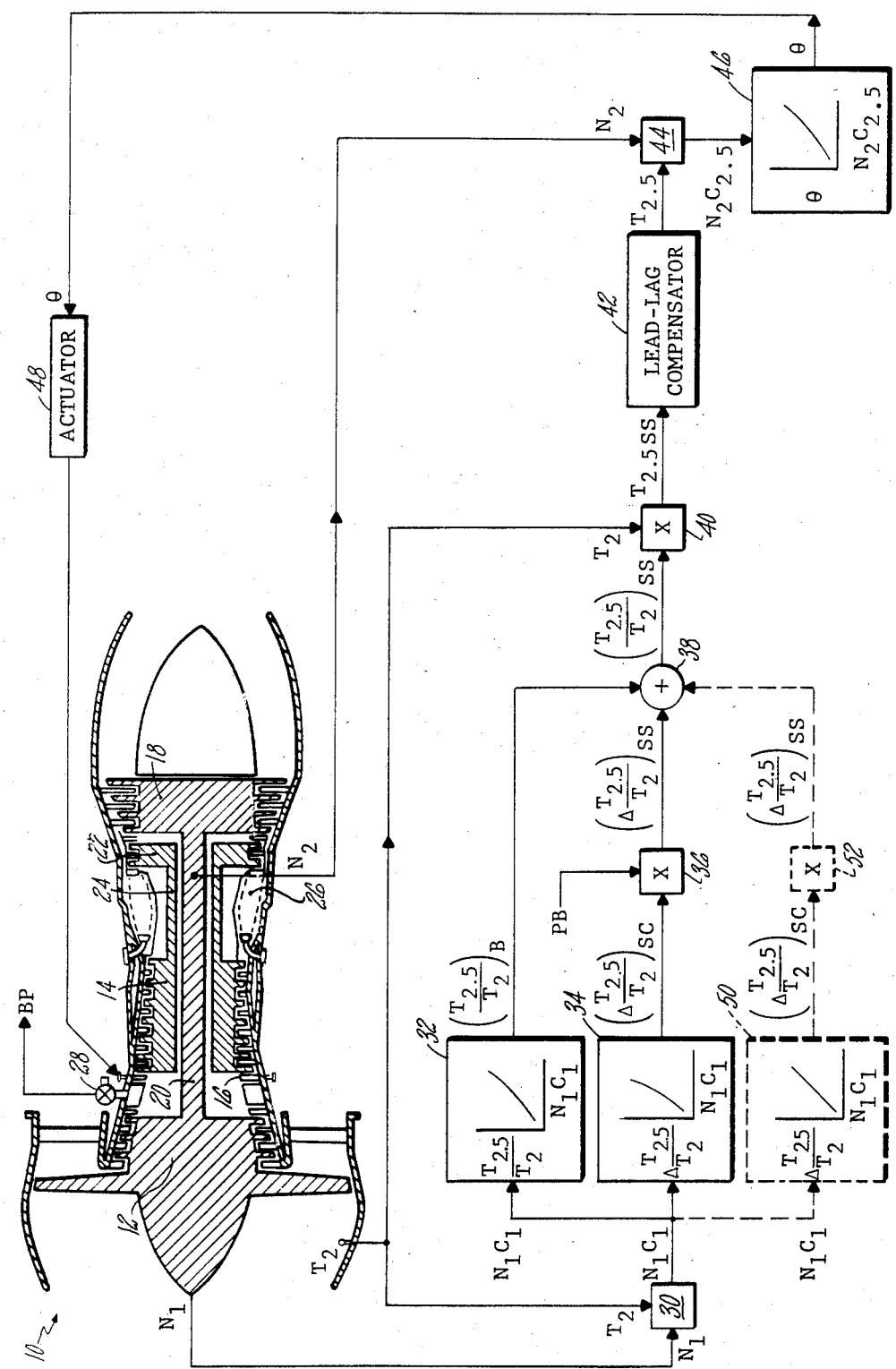

APPARATUS FOR SYNTHESIZING CONTROL PARAMETERS

DESCRIPTION

1. Technical Field

This invention relates to operating controls for a gas turbine engine.

2. Background Art

Controlling the operation of a gas turbine engine involves the measurement and/or synthesis of a variety of parameters which are used to either electronically or mechanically operate the engine both on the ground and in the air. Reliability is critical; and, therefore, redundancy is built into most if not all aspects of the control system. Direct measurement of some parameters can be difficult and unreliable in view of the extreme operating environment which exists at various locations within the engine. Also, some gas turbine engine functions vary as the engine configuration varies during operation, making them more difficult to synthesize accurately under all engine operating conditions. It is desirable to be able to synthesize such control parameters accurately and reliably to improve engine performance and reliability.

DISCLOSURE OF INVENTION

One object of the present invention is improved means for synthesizing a control parameter for use in a gas tubine engine.

Another object of the present invention is apparatus for more accurately synthesizing the high compressor inlet temperature of a twin spool gas turbine engine.

According to the present invention, apparatus for synthesizing a control parameter for use in a gas turbine engine includes a first function generator, responsive to an engine operating parameter, for generating a singal simulating the value of a control parameter for a base engine operating configuration, a second function generator, responsive to an engine operating parameter, for generating a signal simulating the difference between the value of the simulated control parameter for the base engine configuration and the value of the control parameter for a different engine operating configuration, means for operating on the simulated difference in values to produce a third signal which simulates the said difference in value for the actual engine operating configuration, and summing means for adding the first and third signals to produce a fourth signal which simulates the control parameter for the actual engine operating configuration.

Synthesizing a control parameter often involves a function generator which is responsive to a measured or otherwise generated engine operating parameter for generating a signal simulating the value of the desired control parameter based upon a preselected engine operating configuration, which is herein referred to as the base configuration. Under actual operating conditions, which may involve an engine configuration different from the base configuration, such a function generator may not provide a sufficiently accurate output. In accordance with the present invention, a second function generator, responsive to another or the same engine operating parameter, generates a signal which simulates the difference between the value of the control parameter for the base engine configuration and the value of the control parameter for a second engine operating configuration different from the base configuration. This difference is then adjusted to account for the actual engine operating configuration at the instant of measurement based upon a known relationship between the second engine configuration and the actual engine configuration.

A signal is thus provided which is indicative of the difference between the simulated value of the control parameter for the base engine configuration and for the actual engine configuration. If this difference is added to the simulated value of the control parameter for the engine operating in the base configuration, a signal indicative of the control parameter for the engine actual operating configuration at the instant of measurement is produced. A variety of different engine configurations can be provided for in this manner, and the base configuration simulated control parameter value may be corrected accordingly by adding to it each of the differences which apply for the engine configuration at the instant of measurement.

More specifically, in a twin spool gas turbine engine a schedule can be developed, such as analytically and by engine testing, for the ratio of high rotor inlet temperature to low rotor inlet temperature as a function of low rotor speed (corrected for low rotor inlet temperature) for any specific engine configuration. The schedule is different for different levels of, for example, compressor bleed rates. In accordance with a preferred embodiment of the present invention, in a control system a first function generator is used to produce a signal simulating the value of the temperature ratio for a preselected base engine configuration, such as with the compressor bleed valves closed to prevent any bleeding of compressor air. A second function generator incorporates a schedule for the difference between the temperature ratio for the base configuration and the temperature ratio for a second, different configuration, such as with the bleed valves 100% open. Then, if the bleed valves are only partially open, the scheduled difference is multiplied by an appropriate fraction to obtain the temperature ratio difference for the actual bleed valve position as determined by the control system or other suitable means. This adjusted difference is then added to the simulated temperature ratio for the base configuration to produce a signal indicative of the temperature ratio for the actual engine configuration wherein the bleed valve is only partially open. This simulated temperature ratio may now be further operated upon or used to generate other engine parameters for purposes of controlling various engine functions, such as stator vane position, burner fuel flow, fault detection, or the like.

The advantages of the present invention over mechanical systems for measuring engine operating parameters, such as temperature probes, are improved accuracy, reliability, and maintainability, and reduced cost and weight.

The foregoing and other objects, features and advantages of the present invention will become more apparent in the light of the following detailed description of preferred embodiments thereof as shown in the accompanying drawing.

BRIEF DESCRIPTION OF THE DRAWING

The sole FIGURE is a schematic and block diagram showing a twin spool gas turbine engine incorporating the control parameter synthesizing apparatus of the present invention.

BEST MODE FOR CARRYING OUT THE INVENTION

A simplified representation of the present invention is shown in the drawing, wherein a gas turbine engine is drawn schematically and is generally represented by the reference numeral 10. In this particular example the engine 10 is a twin spool ducted fan engine having a low compressor 12 followed by a high compressor 14. The low compressor 12 is driven by the low turbine 18 to which it is connected by a shaft 20. The high compressor 14 includes a stage of variable position stator vanes 16, and is driven by a high turbine 22 to which it is connected through a shaft 24. A combustor or burner 26, to which fuel is supplied, provides energy to drive the turbines 18, 22. The engine also includes one or more bleed valves 28, within the compressor system.

As one example of the present invention, consider the positioning of the variable stator vanes 16 during engine operation. The stator vane angular position is herein designated by the reference character $\theta$. A schedule for the position of the variable stator vanes, as a function of high compressor speed $N_2$ corrected for high compressor inlet temperature $T_{2.5}$ is developed empirically and/or analytically by means well known in the art. To properly position the stator vanes during engine operation, it is necessary to know the value of $T_{2.5}$ at the instant of interest. $T_{2.5}$ is, therefore, a control parameter for the vane position $\theta$. Since such a temperature is difficult to measure accurately and reliably, it is synthesized in accordance with the present invention.

Referring to the drawing, the low rotor speed $N_1$ is measured, as is the inlet temperature $T_2$ to the low compressor, and signals indicative of the value thereof are fed to a calculator 30 which calculates $$\text{the corrected low rotor speed } N_1C_1 = \frac{N_1}{\sqrt{T_2/518.7}}$$

by means well known in the art. $N_1C$ is an engine operating parameter. The corrected low rotor speed signal is fed to a function generator 32 which includes a schedule for $T_{2.5}/T_2$ based upon test data and/or analytical data for the engine in a preselected base configuration (subscript B), such as with the bleed valve 28 fully closed and the engine operating at steady state. This ratio is herein designated $$\left(\frac{T_{2.5}}{T_2}\right)_B.$$

If the bleed valve position were open, or partially open, a different schedule would result. Therefore, the temperature ratio generated at any particular instant by the function generator 32 is accurate only if the engine is at steady state and in the base configuration at the time.

In accordance with the teachings of the present invention, a second function generator 34 is used to correct the temperature ratio generated by the function generator 32 in the event the engine configuration, at the time of control operation, is not in the base configuration. The function generator 34 also receives a signal indicative of the value of the corrected low rotor speed $N_1C_1$. The function generator 34 includes a schedule, based upon steady state operation, of the difference in value between the temperature ratio of the base configuration and the temperature ratio at some other preselected engine configuration, different from the base configuration, such as with the bleed valve 28 fully open. The difference in the temperature ratios between the base configuration and the second configuration (subscript sc) is herein designated as:

$$\left(\Delta\frac{T_{2.5}}{T_2}\right)_{sc}$$

Next, the actual bleed valve position (i.e., actual engine configuration) is determined and a signal ("BP" in the drawing) indicative thereof is sent to a calculator 36, along with the output from the function generator 34, whereby the temperature ratio difference is operated upon in an appropriate manner to adjust it for the actual engine configuration. Thus, the output from the calculator 36 simulates the value of the temperature ratio difference $$\left(\Delta\frac{T_{2.5}}{T_2}\right)_{ss}$$

for the actual engine configuration at the time the calculations are being made, under steady state (subscript ss) conditions. In this exemplary embodiment, the temperature ratio difference at any corrected speed $N_1C$ is a straight line function of the bleed valve position. If the second engine configuration used in the function generator 34 is for a 100% open bleed valve, and if the base configuration is with the bleed valve fully closed, the temperature ratio difference generated by the function generator 34 need only be multiplied by the percent the valve 28 is open to produce the desired result. In that case the calculator 36 is a multiplier, as shown.

The temperature ratio generated by the function generator 32 and the temperature ratio difference produced by the calculator 36 are then summed in an adder 38 whose output will be $$\left(\frac{T_{2.5}}{T_2}\right)_{ss},$$

which is an accurately synthesized value of the control parameter based upon steady state engine operation.

This synthesized ratio can now be further operated upon and used to control various engine functions which have known functional relationships with that control parameter or with a control parameter which is derived or developed therefrom. In this embodiment the temperature ratio and the measured temperature $T_2$ are multiplied together in a multiplier 40 to yield the synthesized control parameter $(T_{2.5})_{ss}$. The steady state high compressor inlet temperature signal is then fed from the multiplier 40 to a lead/lag compensator 42 whose output is the high compressor inlet temperature adjusted for transient operation of the engine. Of course, if the engine is operating at steady state there will be no change between the input to the lead/lag compensator and its output. The output temperature from the lead/lag compensator and the high rotor speed $N_2$ are fed to a calculator 44 whose output is a simulated corrected high rotor speed $$N_2C_{2.5} = \frac{N_2}{\sqrt{T_{2.5}/518.7}}.$$

The corrected high rotor speed signal is fed to a function generator 46 which includes a schedule of stator vane position $\theta$ as a function of corrected high rotor speed. The output from the function generator 46 is fed to an actuator 48 which moves the stator vanes 16 to their proper angular position.

Any number of different engine configurations which affect the control parameter schedule for the base engine configuration may be accounted for by the present invention. For example, apparatus (not shown) for actively controlling the clearance between the outer air seal of a gas turbine engine and the tip of the turbine rotor provides a variable engine configuration which changes the schedule of $T_{2.5}/T_2$ for the base configuration. An example of such apparatus is shown in commonly owned U.S. Pat. No. 4,069,662 to Ira H. Redinger, Jr., et al wherein the clearance between an air seal and a turbine rotor is controlled selectively by turning on and off or modulating the cooling air supply which is directed in proximity to the air seal supporting structure so as to control its thermal growth. The cooling causes shrinkage thereby holding the clearance low and effectively reducing fuel consumption. The amount of cooling air used for this purpose depends upon, for example, the position of a valve. Except for the valve position assumed for the base engine configuration (such as fully closed), each valve position produces a different schedule of temperature ratios as a function of corrected low rotor speed. A function generator 50, shown in phantom, includes a schedule, based upon corrected low rotor speed $N_1C_1$ and steady state operation, of the difference in value between the temperature ratio of the base configuration and the temperature ratio for a different configuration, such as with the clearance control valve fully open (maximum air flow). As shown in the drawing, the output from the function generator 50 is sent to a multiplier 52 along with a signal which is indicative of the percent the clearance control valve is actually open. The output of the multiplier 52 simulates the value of the temperature ratio difference $$\left(\Delta \frac{T_{2.5}}{T_2}\right)_{ss}$$

for the actual engine configuration at the time the calculations are being made. This temperature ratio difference is sent to the adder 38 along with the output from the multiplier 36 and function generator 32. The output from the adder 38 will now be the steady state temperature ratio of an engine configuration which is based upon the actual bleed valve position as well as the actual position of the clearance control valve.

In the foregoing embodiment each of the function generators 32, 34, 50 are responsive to the same engine operating parameter $N_1C_1$. This is not required. For example, the function generators 32 and 34 could be responsive to $N_1C_1$, while the function generator 50 is responsive to $N_2$ corrected for low rotor inlet temperature $T_2$.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. Apparatus for synthesizing a control parameter for use in a gas turbine engine, comprising:
    first function generator means responsive to an engine operating parameter for generating a first signal simulating the value of a control parameter for the engine operating in a preselected base configuration;
    second function generator means responsive to an engine operating parameter for generating a second signal simulating the difference between the value of said control parameter for the base engine configuration and the value of said control parameter for a second preselected engine operating configuration different from said base configuration;
    means for operating on said second signal to produce a third signal simulating said difference in values for the actual engine operating configuration; and
    means for summing said first and third signals to produce a fourth signal simulating said control parameter for said actual engine operating configuration.

2. The apparatus according to claim 1 wherein said first, second, third and fourth signals are indicative of steady state engine operation, and said apparatus includes means for operating on said fourth signal to produce a control parameter which is corrected for transient engine operation.

3. The apparatus according to claim 1 wherein said first and second function generator means are responsive to the same engine operating parameter.

4. In a twin spool gas turbine engine having a low compressor and a high compressor, a control system for synthesizing the inlet temperature of the high compressor, comprising:
    means for determining the rotational speed of the low compressor and producing a signal indicative thereof;
    means for determining the inlet temperature to the low compressor and producing a signal indicative thereof;
    means responsive to said speed signal and said inlet temperature to produce a signal indicative of low compressor speed corrected for low compressor inlet temperature;
    first function generator responsive to said corrected low compressor speed signal for generating a first signal simulating the ratio of high compressor inlet temperature to low compressor inlet temperature for the engine operating at steady state in a preselected, base configuration;
    second function generator means responsive to said corrected low rotor speed signal for generating a second signal simulating the difference between said temperature ratio for said base configuration and said temperature ratio for the engine operating at steady state in a preselected second configuration different from said base configuration;
    means for operating on said second signal to produce a third signal simulating the difference between said base configuration temperature ratio and said second configuration temperature ratio for the engine operating at steady state in its actual engine configuration;

means for summing said first and third signals to produce a fourth signal simulating said temperature ratio for the engine operating at steady state in said actual engine configuration; and means for multiplying said temperature ratio represented by said fourth signal by said low compressor inlet temperature to generate a fifth signal simulating the actual inlet temperature to the high compressor under steady state conditions.

5. The control system according to claim 4 including third function generator means responsive to said fifth signal for generating a sixth signal indicative of simulated high compressor inlet temperature corrected for transient engine operation.

6. The control system according to claim 5, wherein the engine includes a stage of variable geometry stator vanes in said high compressor, the apparatus further comprising:

means for determining the speed of said high compressor and producing a signal indicative thereof;

means responsive to said high compressor speed signal and said simulated high compressor inlet temperature corrected for transient engine operation for producing a signal simulating the high compressor speed corrected for high compressor inlet temperature; and fourth function generator means responsive to said simulated, corrected high compressor speed signal for generating a position signal indicative of the desired position of said stator vanes; and actuation means connected to said stator vanes and responsive to said position signal for moving said stator vanes to the desired position.

7. The control system according to claim 6 wherein the engine includes variable position bleed valve means for bleeeding air from one of said compressors, and said base engine configuration is a configuration with said valve means in a first position permitting a first amount of bleed, and said second engine configuration is a configuration with said valve means in a second position different from said first position permitting a second amount of bleed.

* * * * *